T. HORNECKER.
WEED CUTTER AND SPRAYER.
APPLICATION FILED MAY 15, 1916.
1,204,772.
Patented Nov. 14, 1916.
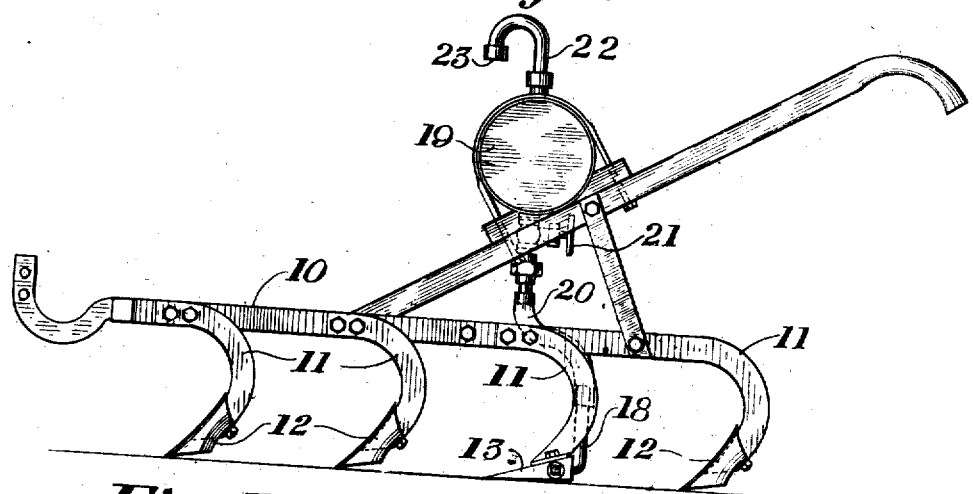
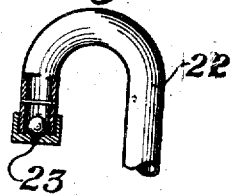
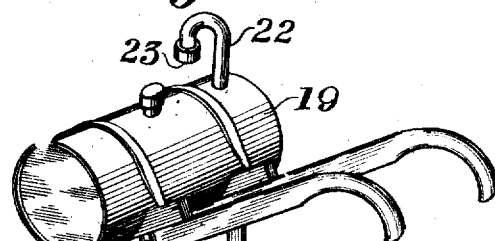
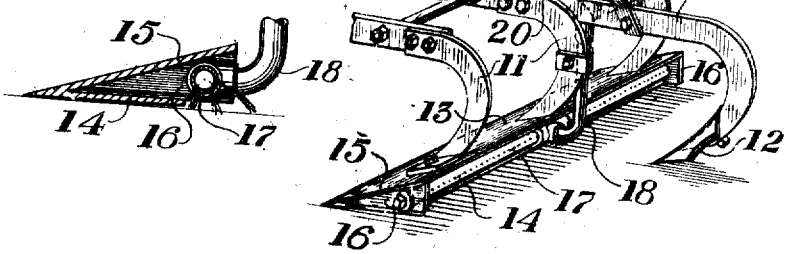
WITNESSES:
B. R. Abbott.
Charles Pickles
INVENTOR
Thomas Hornecker.
By Strong & Townsend
ATTORNEYS

UNITED STATES PATENT OFFICE.

THOMAS HORNECKER, OF LA FAYETTE, CALIFORNIA.

WEED CUTTER AND SPRAYER.

1,204,772.  Specification of Letters Patent.  Patented Nov. 14, 1916.

Application filed May 15, 1916. Serial No. 97,563.

*To all whom it may concern:*

Be it known that I, THOMAS HORNECKER, a subject of the Emperor of Germany, residing at La Fayette, in the county of Contra Costa and State of California, have invented new and useful Improvements in Weed Cutters and Sprayers, of which the following is a specification.

This invention relates to weed cutters and sprayers; and has for its object to provide, in connection with the cultivator, a simple and improved means to cut the weeds and inject a liquid spray beneath the surface of the ground, whereby to permanently destroy all objectionable plants and larva.

In carrying out this object I employ a novel form of surfacer blade which is easily attached to the ordinary cultivator, a spray pipe carried by the blade to direct a liquid beneath the surface of the ground, and a tank adapted to be carried by the cultivator having connections with the spray pipe for supplying the liquid.

One form which my invention may assume is exemplified in the following description and illustrated in the accompanying drawings, in which—

Figure 1 shows a side elevation of a device embodying my invention. Fig. 2 shows a perspective view of the same. Fig. 3 shows a detail view, partly in section, of the check valve used on the supply tank. Fig. 4 shows a transverse, sectional view of the blade.

In the drawings, I have shown a cultivator 10, of any suitable form, having shovel beams 11 adapted to receive shovels 12. From certain of the beams I remove the shovels and attach a surfacer blade 13. There are various other ways of attaching the blade and in some instances I employ separate standards for this purpose. The blade is carried in a horizontal position and extends transversely of the cultivator and is substantially V-shaped in cross section, being formed of a bottom member 14 and an upwardly inclined face 15, the ends 16 being closed and the back portion being open.

Extending longitudinally of the blade is a spray pipe 17 provided with openings in its lower and rear walls to direct a spray downwardly and rearwardly. Connected with the spray pipe, by means of a T-joint, is a supply pipe 18 extending vertically to a tank 19, the latter being detachably carried upon the cultivator frame. Included in the supply pipe 18 is a rubber hose section 20 to allow for the necessary movements and vibrations, and a valve 21 to control the passage of liquid therethrough. The tank is preferably fitted with a U-shaped pipe 22, carrying at its outer end a check valve 23, whereby to admit air.

In the operation of the device, the cutting and destroying of weeds and the like are carried on in connection with the usual cultivating or tilling of the ground. The blade is set to cut the surface of the ground and thereby to remove all weeds. The spray pipe, owing to its location beneath the top surface of the blade, will direct its spray beneath the surface of the ground where it will act effectively upon the roots of weeds and such insects as infest the ground. Any desired liquid suited for the purpose may be employed.

Various changes in the construction and arrangement of the several parts herein shown and described may be employed without departing from the spirit of my invention as disclosed in the appended claims.

As best shown in Fig. 4, the bottom 14 is terminated a short distance in front of the pipe, so that the spray can be directed downwardly and strike the roots of weeds before the earth on top of the blade has an opportunity to interfere.

Having thus described my invention, what I claim and desire to secure by Letters Patent is—

1. An attachment for cultivators, comprising a transversely extending surfacer blade, V-shaped in cross section, closed at its ends and open at its rear side, a pipe extending longitudinally through said blade and supported to said ends, said pipe being provided with apertures to direct a spray of liquid to the rear of the blade, and supply means for said pipe detachably carried upon the cultivator.

2. An attachment for cultivators, comprising a transversely extending surfacer blade, V-shaped in cross section, closed at its ends and open at its rear side, a pipe extending longitudinally through said blade and supported in the ends of said blade at the rear thereof, said pipe being provided with apertures in its lower and rear walls, the rear edge of the lower wall of said blade resting in front of the apertures in the lower wall of said pipe, and supply means for said pipe.

In testimony whereof I have hereunto set my hand in the presence of two subscribing witnesses.

THOMAS HORNECKER.

Witnesses:
  JOHN H. HERRING,
  W. W. HEALEY.